Dec. 16, 1941.  W. VAN GUILDER  2,266,103
THERMOSTAT
Filed July 13, 1939
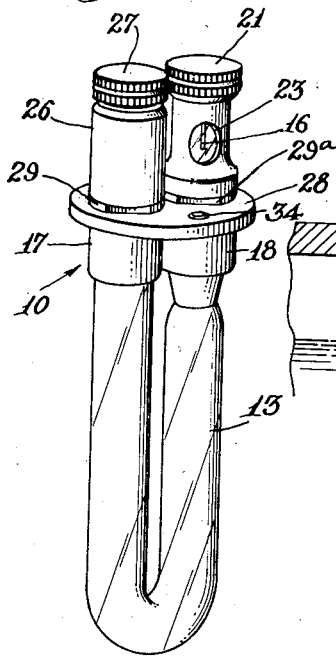
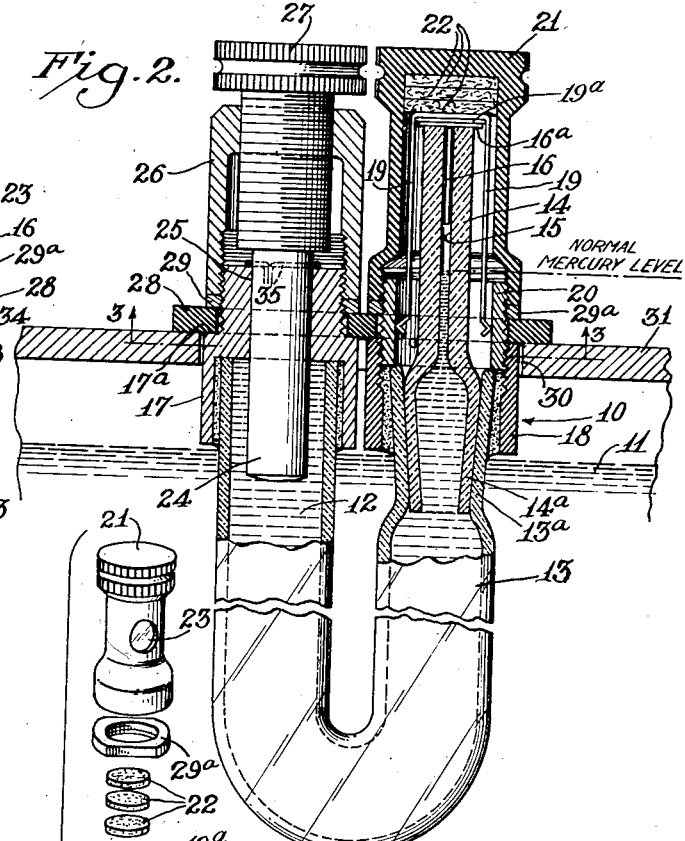
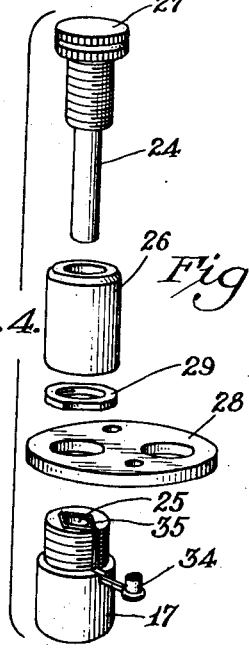
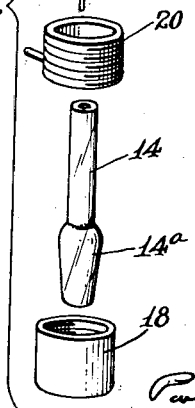
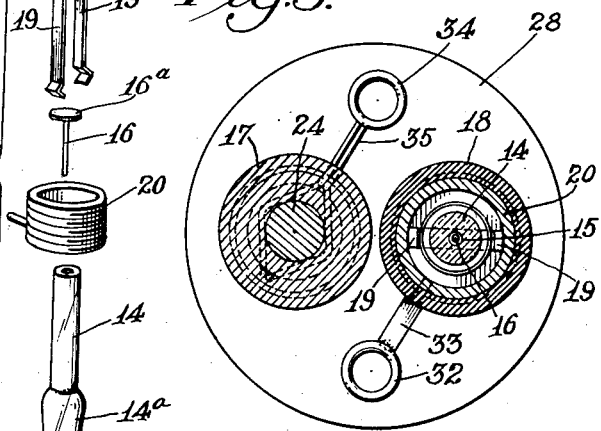
Inventor
Walter Van Guilder
BY
Parker Carlson Pitzner Hubbard
Attorneys.

Patented Dec. 16, 1941

2,266,103

UNITED STATES PATENT OFFICE 2,266,103

THERMOSTAT

Walter Van Guilder, River Forest, Ill., assignor to Precision Scientific Company, Chicago, Ill., a corporation of Illinois Application July 13, 1939, Serial No. 284,286

8 Claims. (Cl. 200—141)

The invention relates to thermostats and more particularly to improvements in immersion thermostats of the general type used for regulating the temperature of baths or bodies of liquid and the like.

One general object of the invention is to provide a thermostat embodying a U-tube containing a body of thermally expansive and electrically conductive liquid such as mercury adapted to complete an electric circuit upon a predetermined thermal expansion, having an improved arrangement for adjusting the temperature setting of the device.

Another object is to provide an expansible liquid U-tube immersion thermostat embodying a novel arrangement of parts such as to facilitate disassembly and reassembly of the structure for purposes of cleaning or replacement of parts.

A more specific object is to provide a thermostat of the character indicated comprising a contact inserted in a separable capillary tube in which the liquid rises upon thermal expansion, characterized by the provision of a novel screw cap arrangement for removably securing in place not only the capillary tube but also the contact.

Still another object of the invention is to provide an expansible liquid thermostat incorporating various structural improvements by virtue of which low cost and simplicity of construction are combined with ease of adjustment and assembly, as well as accuracy of operation.

Further objects and advantages of the invention will become apparent as the following description proceeds, taken in connection with the accompanying drawing, in which:

Figure 1 is a general perspective view of a thermostat embodying the invention.

Fig. 2 is an enlarged side elevation of the thermostat of Fig. 1, in place in a bath whose temperature it is to regulate, with the upper portion of the device shown in vertical section.

Fig. 3 is a transverse sectional view along the line 3—3 in Fig. 2.

Figs. 4 and 5 are exploded perspective views of the various parts included in the assemblies located respectively on the left and right hand legs of the thermostat of Fig. 1.

For purposes of exemplification, the invention has been shown herein (Fig. 1) as embodied in an immersion thermostat of a form suitable for controlling the temperature of, for example, the oil sample in a viscosimeter or liquid baths used in various chemical processes. Thermostats embodying the invention may, however, take various forms depending in part upon the particular uses for which they are intended. Accordingly, even though a particular embodiment of the invention has been shown and described in some detail there is no intention to thereby limit the invention to such embodiment, but, on the other hand, the appended claims are intended to cover all modifications and alternative constructions falling within the spirit and scope of the invention.

In the illustrative construction (Fig. 1), the thermostat shown embodies a U-shaped tubular structure, designated generally by the numeral 10, and adapted to be inserted in a bath of liquid 11 (Fig. 2) whose temperature is to be regulated. The tubular structure 10 contains a thermally expansible and electrically conductive body of liquid 12 such as mercury. In brief, expansion of the liquid 12 upon being heated causes it to rise in the tubular structure 10 and complete an electric circuit, and, similarly, contraction of the mercury upon the lowering of its temperature causes it to recede and break the circuit.

The tubular structure 10 comprises a glass U-tube 13 (Fig. 2) having upwardly facing open ends on its two legs. To give maximum sensitivity of operation a glass capillary tube 14 is arranged to form an extension of the right hand leg of the U-tube 13. This capillary tube 14 is fashioned with an axial bore 15 of very small diameter communicating with the interior of the U-tube and in which the mercury 12 rises upon thermal expansion. Since the thread of mercury received in the bore 15 is of very small total volume only a small expansion or contraction of the main body of mercury is required to cause the mercury in the bore 15 to rise or recede from a level at which it establishes an electric circuit with an electric contact pin 16 inserted into the top of the bore 15.

To minimize the cost of the parts, the capillary tube 14 and the U-tube 13 are made as separate parts thereof. In such case, the joint between them must be hermetically sealed. An enlarged and tapered end 14a on the capillary tube 14 is received in a complementally flared end 13a on the U-tube 13. The abutting surfaces on the tube ends 13a and 14a are ground so as to have a snug and accurate fit.

The couplings for holding in place the part assemblies secured to the respective legs of the U-tube 13 include sleeves 17 and 18 (Figs. 1 and 2) permanently cemented to the respective tube legs and made of electrical insulating material such as reenforced Bakelite. On the right hand leg of the U-tube 13 is mounted the capillary tube 14 heretofore described and its cooperating contact 16. On the other or left hand leg of the U-tube is mounted a device for adjusting or regulating the temperature at which the thermostat responds.

The contact assembly on the capillary tube 14 (Figs. 2 and 5) includes the contact pin 16 having an enlarged head 16ª resting on the top of the tube. This contact pin may be made of some metal having a high electrical conductivity such as platinum. Resting on the top of the pin head 16ª is a U-shaped resilient sheet metal stamping forming connecting fingers 19 which are resiliently urged outward into engagement with a metal ring 20 threaded in the coupling sleeve 18. A disk 19ª welded to the base of the connecting finger strip rests in face-to-face engagement with the contact head 16ª. In this way the fingers 19 complete a circuit from the pin 16 to the ring 20 irrespective of the angular position of the pin and finger assembly on the capillary tube 14.

To hold both the capillary tube 14 and contact pin assembly in place, a single screw cap 21 is utilized. This cap may be made of molded electrical insulating material such as reenforced Bakelite and is threaded on the upper end of the ring 20. Yieldable disks 22 of cork or the like are inserted between the top wall of the cap 21 and the disk 19ª so as to form a yieldable connection between the screw cap and the parts against which it is pressed. The screw cap 21 is windowed as indicated at 23 (Fig. 1) in order that the operator may observe the condition of the contact pin 16 and the level of the thread of mercury in the capillary tube bore 15.

In order to adjust the temperature setting of the thermostat, a plug 24 (Figs. 2 and 4) is arranged to project into the left hand leg of the U-tube 13. By moving this plug down into the U-tube a corresponding amount of mercury is displaced and the level of the thread of mercury in the capillary tube bore 15 correspondingly adjusted. For this purpose, the plug 24 is mounted in an axial bore 25 fixed in the coupling sleeve 17 and is threaded in a cap 26 which is in turn threaded on the exterior of the sleeve 17. The head 27 of the plug 24 matches in form the head of the screw cap 21 (see Fig. 1) so as to give the device a symmetrical and pleasing appearance. The cap 26 and plug head 27 are preferably made of molded insulating material although the plug itself is made of electrically conductive metal, such, for example, as stainless steel, since the electric control circuit in the thermostat is completed through this plug.

Terminals connected respectively to the plug 24 and ring 20 are mounted on a supporting plate 28 (Figs. 2 and 4) made of suitable electrical insulating material. This plate is apertured to receive the ends of the U-shaped structure 10 and is clamped against abutments on the coupling sleeves 17, 18 by the screw caps 21 and 26. In particular, the plate 28 rests on a shoulder 17ª fashioned on the coupling sleeve 17, being pressed against it by the screw cap 26 and an interposed nut 29. Similarly, the plate 28 also rests on the end of the other coupling sleeve 18 and is pressed against it by the screw cap 21 and an interposed nut 29ª. The edges of the plate 28 project laterally from the U-shaped structure 10 so that when the device is inserted into an aperture 30 (Fig. 2) in the top of a tank 31 the plate 28 holds it in place with the lower portion of the U-shaped structure 10 immersed in the bath 11 within the tank.

On the right hand leg of the thermostat the ring 20, which is connected with the contact pin 16 as heretofore described, is connected to a terminal 32 (Fig. 3) by conductor 33. Similarly, the plug 24 at the other end of the mercury column is connected to a second terminal 34 on the cover plate 28 by a resilient wire 35. This wire 35 is bent into diamond shape (Figs. 3 and 4) and embraces the plug 24. The resilient wire 35 is dimensioned so that it closely and frictionally engages the plug 24 to form a good electrical connection with it and also to hold the plug frictionally against inadvertent displacement.

To condition the thermostat for operation the U-tube 13 and capillary tube 14 are thoroughly cleaned and then filled with mercury to substantially the normal level (Fig. 2). The various parts on the two legs of the U-shaped structure are then assembled as heretofore described and the screw caps 21 and 26 threaded into place so as to hold the parts together. The plug 24 is then adjusted in position by turning the head 27 until the thread of mercury in the capillary tube bore 15 is located at exactly the desired point of adjustment or normal level, as observed through the window 23.

In the operation of the thermostat described it may be located on a tank 31 as shown in Fig. 2 with the U-tube immersed in a bath of liquid 11. The thermostat is adjusted as previously described for some selected temperature at which the bath is to be maintained. In the event that the temperature of the bath rises above this selected temperature the mercury 12 will expand, thus causing the thread of mercury to rise in the capillary tube bore 15 until it touches the contact 16. Thereupon a circuit is completed between the terminals 32 and 24 through the plug 24, mercury 12, contact pin 16, fingers 19 and ring 20. A temperature regulating or signal device connected across the terminals 32, 34 is thus actuated. Similarly, when the temperature again drops below the predetermined maximum the mercury recedes from the contact pin 16 so as to interrupt the circuit previously established.

From the foregoing, it will be seen that a thermostat has been provided which, although very accurate and precise in operation, is simple to construct and easy to adjust. Furthermore, all of the parts can be quickly and easily disassembled in order to clean or repair the thermostat as may be required.

I claim as my invention:

1. A thermostat comprising, in combination, a generally U-shaped tubular structure adapted to contain a body of thermally expansive and electrically conductive liquid, the legs of said U-shaped structure presenting shouldered upper ends, and a flat supporting plate apertured to receive the upper ends of said legs and resting on the shoulders of said legs, and means including a pair of cup shaped closure caps telescoped over and threaded on the upper ends of respective ones of said legs for clamping said supporting plate against said shoulders.

2. A thermostat comprising, in combination, a glass U-tube adapted to contain a body of thermally expansive and electrically conductive liquid, coupling sleeves fixed on the upper ends of said U-tube and each presenting an upwardly facing abutment, and a supporting plate made of electrical insulating material having apertures registering with the upper ends of said U-tube and resting on the abutments on said sleeves, an electrical terminal for the device carried by said plate, and means including a pair of cup shaped closure caps telescoped over and removably connected to said sleeves for clamping said supporting plate against said abutments.

3. In a thermostat the combination of a U-tube presenting an upwardly facing opening in at least one end thereof and adapted to contain a body of thermally expansive and electrically conductive liquid, a capillary tube removably inserted in the open end of said U-tube and having an axial bore communicating with the interior of the U-tube, an electrical contact pin projecting into the upper end of said capillary tube bore and having a head thereon resting on the upper end of said capillary tube, means including a cap of inverted cup shape telescoped over the top of said capillary tube and the head of said contact for holding the same in place, and a yieldable member interposed between the end wall of said cap and the head of said contact pin.

4. In a thermostat the combination of a generally U-shaped tubular structure adapted to contain a body of thermally expansive and electrically conductive liquid, said structure having a capillary bore in the upper end of one leg, a headed contact pin projecting into the capillary tube bore, a metal ring encircling said one leg of the tubular structure, and a resilient metal spring finger fitted over the head of said contact pin and yieldably urged against said ring for establishing an electrical circuit therebetween.

5. In a thermostat the combination of a generally U-shaped tubular structure adapted to contain a body of thermally expansive and electrically conductive liquid, said structure having a capillary bore in the upper end of one leg, a headed contact pin projecting into the capillary tube bore, a metal ring encircling said one leg of the tubular structure, and a strip of resilient metal of inverted U-shape resting on the head of said contact pin with its legs extending down along the sides of the capillary tube and resiliently urged into engagement with said ring to complete a circuit from the contact pin to it.

6. In a thermostat the combination of a tubular structure adapted to contain a thermally expansive and electrically conductive body of liquid, an electrical contact arranged to be contacted by the liquid upon thermal expansion of the latter, an electrically conductive plunger arranged to project into the liquid to establish a circuit to it, means supporting said plunger for axial adjustment to vary the displacement of liquid by it and thereby vary the normal level of the liquid with respect to said contact, and a resilient connecter member frictionally engaging said plunger for not only completing a circuit to it but for also preventing inadvertent displacement of it.

7. In a thermostat the combination of a generally U-shaped tubular structure adapted to contain a body of thermally expansive and electrically conductive liquid, said structure having a capillary bore in the upper end of one leg, a contact projecting into the capillary tube bore, a metal ring encircling said one leg of the tubular structure, and a metallic conductor extending from the upper end of said pin to said ring and removably contacting the latter for establishing an electrical circuit therebetween.

8. In a thermostat the combination of a generally U-shaped structure adapted to contain a body of thermally expansive and electrically conductive liquid, said structure having a capillary bore in the upper end of one leg, a contact projecting into the capillary tube bore, a metal ring encircling said one leg of the tubular structure and secured thereto, a metallic conductor extending from the upper end of said pin to said ring and removably contacting the latter for establishing an electrical circuit therebetween, and a housing of generally inverted cup shape telescoped down over the end of said one leg and enclosing said conductor and threaded on the exterior of said ring.

WALTER VAN GUILDER.